H. J. MICHAELSEN.
SUPPORT FOR GRAIN CLEANERS.
APPLICATION FILED JULY 28, 1910.
995,167.
Patented June 13, 1911.
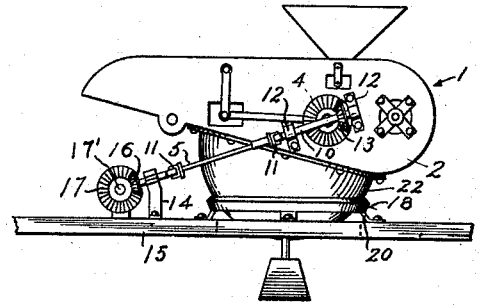
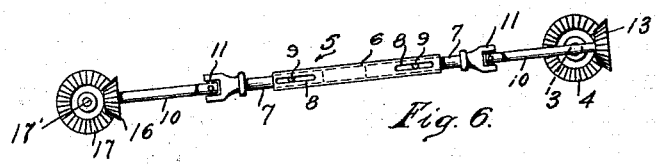
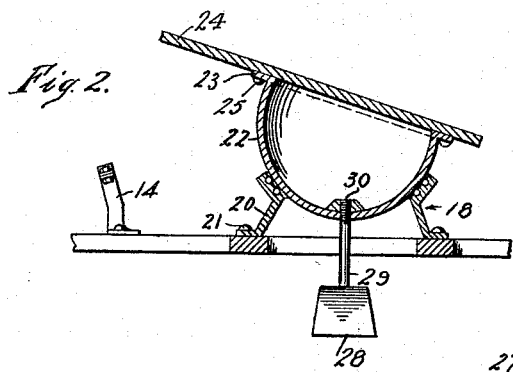
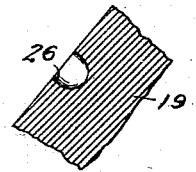
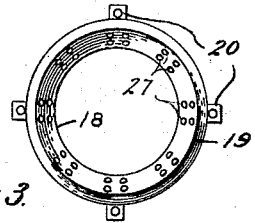
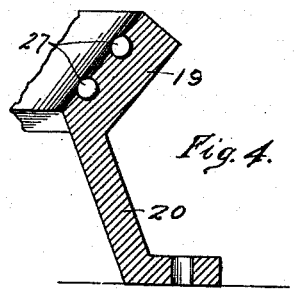
Inventor
H. J. Michaelsen,
Witnesses
J. S. Freeman.
By C. L. Parker, Attorney

UNITED STATES PATENT OFFICE.

HENRY J. MICHAELSEN, OF MOSCOW, IDAHO, ASSIGNOR TO THE MICHAELSEN MANUFACTURING COMPANY LIMITED, OF MOSCOW, IDAHO, A CORPORATION OF IDAHO.

SUPPORT FOR GRAIN-CLEANERS.

995,167.  Specification of Letters Patent.  Patented June 13, 1911.

Application filed July 28, 1910. Serial No. 574,318.

*To all whom it may concern:*

Be it known that I, HENRY J. MICHAELSEN, a citizen of the United States, residing at Moscow, in the county of Latah and State of Idaho, have invented certain new and useful Improvements in Supports for Grain-Cleaners, of which the following is a specification.

In combined harvesters and threshers means are generally provided for cleaning the grain after its removal from the straw, a separate mechanism being provided therefor. The operation of this grain-cleaning mechanism is detrimentally affected or even rendered inoperative by the said apparatus being tilted, as by reason of the travel of the implement over uneven or sloping ground. In machines of this character, the grain-cleaning apparatus is rigidly mounted upon the frame of the same, whereby when said frame is tilted the grain-cleaning apparatus is also tilted or the cleaning mechanism is adjustably mounted upon the main frame of the same, and manually operated means are provided for keeping it in its proper position. Both of these methods are unsatisfactory. So far as I am aware, no simple and effective means have been provided for retaining the grain-cleaning mechanism in its proper position, when the frame of the harvester is tilted.

An important object of my invention is to provide means for mounting a grain-cleaning apparatus upon the main frame of a combined harvester and thresher or the like, which will permit said mechanism to remain in its proper, normal position, independently of any change in the angular position assumed by the main frame.

A further object of this invention is to provide connecting means between the grain-cleaning apparatus and the main frame of the combined harvester and thresher, which is in effect a universal joint, together with simple and automatic means for retaining the grain-cleaning apparatus in its proper position.

Other objects and advantages of this invention will be apparent hereinafter.

In the accompanying drawings, forming a part of this specification, and in which like numerals are employed to designate like parts, throughout the same, Figure 1 is a side view of the grain-cleaning apparatus, showing my improved means for connecting the same with the main frame of a combined harvester and thresher, Fig. 2 is a central vertical section through the connecting means, Fig. 3 is a top plan view of the socket-member of the connecting means, Fig. 4 is an enlarged sectional view through the socket-member, Fig. 5 is an enlarged detail section through the socket-member, and showing one of the ball-sockets formed therein, and Fig. 6 is an enlarged elevation of the extensible shaft.

In the drawings, wherein is illustrated a preferred embodiment of my invention, the numeral 1 designates a grain-cleaning apparatus, as a whole, which may be of any well known or preferred type. This grain-cleaning apparatus will not be described, in detail, as no claim will be made to the same, *per se*. The mechanism of this grain-cleaning apparatus is mounted within its casing 2. This mechanism is actuated by means of a shaft 3, having a bevel-gear 4 rigidly mounted upon the same, as shown. A combined flexible and extensible shaft 5 is provided, comprising a tubular central portion 6, within which is slidably mounted shafts 7, as shown. The tubular portion 6 is provided with elongated slots 8 near its ends, for the reception of pins 9 having rigid engagement with the shafts 7.

From the description of the above referred to parts, it is obvious that the shafts 7 may move longitudinally within the tubular portion 6, but cannot rotate therein. The shafts 7 have universal connection with shafts 10, as shown at 11. The upper shaft 7 is journaled through brackets 12, which are bolted to one side of the casing 2. The shaft 10 has a bevel-gear 13 rigidly connected therewith, and in engagement with the bevel-gear 4. The other shaft 10 is journaled through a bracket 14, rigidly mounted upon a main frame 15 of a combined harvester and thresher, or the like. The lower shaft 10 is provided with a bevel-gear 16, which engages a bevel-gear 17, suitably mounted upon the main frame 15. The bevel-gear 17 is mounted upon a shaft 17' driven by a suitable motor (not shown) which is disposed upon the main frame 15. It is obvious that the rotation of the bevel-gear 17 will be imparted to the bevel-gear 4, by mean of the combined extensible and flexible shaft, above described.

Rigidly mounted upon the main frame 15, is a socket member 18, comprising an annular body portion 19 having legs 20 carried thereon, and preferably cast integral therewith. The legs are suitably bolted to the main frame 15, as shown at 21. Adapted to fit within the socket-member 18, is a hollow ball or substantially hemispherical member 22, having its material bent outwardly for forming circumferential flanges, or ears 23, which are bolted to the bottom 24 of the casing 2, as shown at 25. The annular body portion 19, is provided upon its inner surface with a plurality of openings 26, for rotatably holding balls 27. The openings 26 are preferably arranged in spaced groups of four, as shown, although I do not restrict myself to this specific arrangement alone. From the description of the above referred to parts, it will be obvious that the socket-member 18 is free to move about the ball-member 22. In order that the grain-cleaning apparatus 1 may be retained in its requisite position, when the main frame 15 and socket-member 18 are tilted, a weight 28 is provided, having rigid connection with a vertically disposed shaft 29, which is rigidly connected with the ball-member 22, at the point which it is desired shall occupy the lowermost position.

In the use of the grain-cleaning apparatus, it is actuated by the extensible and flexible shaft 5, which, as above stated is not affected by the relative movements of the grain-cleaning apparatus and main frame 15. When the main frame 15 is tilted, the weight 28 will prevent the ball-member 22 from partaking of this tilting movement, whereby the grain-cleaning apparatus is retained in its requisite position. It is thus seen that I have provided means for retaining the grain-cleaning apparatus in its proper position, which is simple in construction and automatic in operation.

It is to be understood that the form of my invention herewith shown and described, is a preferred example of the same, and that numerous changes in the size, shape and arrangement of parts may be resorted to without departing from the spirit of my invention or the scope of the subjoined claim.

Having thus fully described my invention, what I claim as new and desire to secure by Letters Patent, is:—

In apparatus of the character described, the combination with a supporting structure, of a socket-member mounted upon the same, a ball-member for operation within the socket-member, grain-cleaning apparatus mounted upon said ball-member, a weight disposed below said ball-member, means rigidly connecting said weight and ball-member, driving mechanism mounted upon the supporting structure, driven mechanism mounted upon the grain-cleaning apparatus, and self adjusting means for forming an operative connection between said mechanisms, the self adjusting means normally passing substantially through the axis of rotation of said ball-member.

In testimony whereof I affix my signature in presence of two witnesses.

HENRY J. MICHAELSEN.

Witnesses:
 JOHN NISBET,
 CHARLES BESLY.

---

Copies of this patent may be obtained for five cents each, by addressing the "Commissioner of Patents, Washington, D. C."